US 12,394,969 B2

(12) United States Patent
Christianson et al.

(10) Patent No.: US 12,394,969 B2
(45) Date of Patent: Aug. 19, 2025

(54) HIGH TEMPERATURE SUPERCONDUCTOR CABLE TERMINATION

(71) Applicant: NDI Engineering Company, Thorofare, NJ (US)

(72) Inventors: Owen R. Christianson, Reston, VA (US); Michael J. Mielnik, Palmyra, VA (US)

(73) Assignee: NDI Engineering Company, Thorofare, NJ (US)

( * ) Notice: Subject to any disclaimer, the term of this patent is extended or adjusted under 35 U.S.C. 154(b) by 441 days.

(21) Appl. No.: 18/118,522

(22) Filed: Mar. 7, 2023

(65) Prior Publication Data

US 2023/0291195 A1 Sep. 14, 2023

Related U.S. Application Data

(60) Provisional application No. 63/318,873, filed on Mar. 11, 2022.

(51) Int. Cl.
*H02G 15/00* (2006.01)
*H02G 15/06* (2006.01)
*H02G 15/34* (2006.01)

(52) U.S. Cl.
CPC ............. *H02G 15/34* (2013.01); *H02G 15/06* (2013.01)

(58) Field of Classification Search
CPC .................. H02G 15/34; H02G 15/06
See application file for complete search history.

(56) References Cited

U.S. PATENT DOCUMENTS 3,882,687 A * 5/1975 Asztalos ................ F25D 3/10
62/50.7
4,187,387 A * 2/1980 Parmer .................. H01B 5/02
505/885

(Continued)

FOREIGN PATENT DOCUMENTS

JP 4045441 B2 2/2008
WO 2016124276 A1 8/2016

OTHER PUBLICATIONS

"Advanced Compact Shipboard High Temperature Superconducting (HTS) Cable Terminations", Department of Defense, 2020, https://www.sbir.gov/node/1654605, 3 pages.

(Continued)

*Primary Examiner* — Pete T Lee
(74) *Attorney, Agent, or Firm* — Buchanan Ingersoll & Rooney PC

(57) ABSTRACT

A high temperature superconducting (HTS) cable terminator including a first chamber having disposed therein a terminator block electrically connected to an HTS cable conductor received within the first chamber, a cryogenically sealed chamber, a cryogenically sealed chamber conductor electrically connected to the HTS cable conductor via the terminator block, where the cryogenically sealed chamber conductor has a first portion cryogenically sealed within the cryogenically sealed chamber and an end electrically connected to one or more electrical output conductors, and one or more refrigerant lines configured to feed gas refrigerant into the cryogenically sealed chamber, where the gas refrigerant configured to absorb heat from the cryogenically sealed chamber. Also included is a second chamber connected to the first chamber, the second chamber having disposed therein a heat exchanger thermally coupled to the (Continued)

one or more refrigerant lines and configured to extract heat from the gas refrigerant.

18 Claims, 6 Drawing Sheets

(56) References Cited

U.S. PATENT DOCUMENTS

| | | | |
|---|---|---|---|
| 5,193,349 | A * | 3/1993 | Laverman .............. F25J 1/0268 |
| | | | 62/48.1 |
| 9,000,295 | B1 | 4/2015 | Graber et al. |
| 9,666,336 | B2 | 5/2017 | Husband et al. |
| 9,735,562 | B2 | 8/2017 | Lallouet et al. |
| 10,283,241 | B1 | 5/2019 | Kephart et al. |
| 10,453,592 | B1 | 10/2019 | Smith et al. |
| 2014/0302997 | A1 | 10/2014 | Takayasu |
| 2020/0005968 | A1 | 1/2020 | van der Laan |

OTHER PUBLICATIONS

Kim et al., "Cryogenic Thermal Studies on Terminations for Helium Gas Cooled Superconducting Cables", Physics Procedia, 67, Dec. 2015, pp. 201-207.

Shah, D., "Simulation and Optimization of Cryogenic Heat Sink for Superconducting Power Cable Applications", Florida State University Libraries, Electronic Theses, Treatises and Dissertations, The Graduate School, 2013, 81 pages.

* cited by examiner

HIGH TEMPERATURE SUPERCONDUCTOR CABLE TERMINATION

CROSS-REFERENCE TO RELATED APPLICATIONS

This application claims priority from U.S. Provisional Application Ser. No. 63/318,873, titled ADVANCED COMPACT HIGH TEMPERATURE SUPERCONDUCTOR CABLE TERMINATIONS, filed Mar. 11, 2022, incorporated herein by reference in its entirety.

FIELD OF THE INVENTION

The subject matter disclosed herein relates to high temperature superconductor cable terminations.

BACKGROUND OF THE INVENTION

Conventionally, high temperature superconductor (HTS) cables are terminated with devices that utilize liquid cryogens such as liquid nitrogen (LN2). One drawback to using liquid cryogens is their large expansion volumes which must be accounted for in the design of the termination device and which produce a ventilation problem in enclosed spaces. In addition, maintaining an ideal temperature and flow of the liquid cryogens is difficult, which results in a complex and inefficient design for cooling of the HTS cable.

SUMMARY OF THE INVENTION

A high temperature superconducting (HTS) cable terminator including a first chamber having disposed therein a terminator block electrically connected to an HTS cable conductor received within the first chamber, a cryogenically sealed chamber, a cryogenically sealed chamber conductor electrically connected to the HTS cable conductor via the terminator block, where the cryogenically sealed chamber conductor has a first portion cryogenically sealed within the cryogenically sealed chamber and an end electrically connected to one or more electrical output conductors, and one or more refrigerant lines configured to feed gas refrigerant into the cryogenically sealed chamber, where the gas refrigerant is configured to absorb heat from the cryogenically sealed chamber. Also included is a second chamber connected to the first chamber, the second chamber having disposed therein a heat exchanger thermally coupled to the one or more refrigerant lines and configured to extract heat from the gas refrigerant.

A high temperature superconducting (HTS) cable terminator system including a source HTS cable terminator including a first source chamber having disposed therein a source terminator block electrically connected to an HTS cable conductor received within the first source chamber, a source cryogenically sealed chamber, a source cryogenically sealed chamber conductor electrically connected to the HTS cable conductor via the source terminator block, where the source cryogenically sealed chamber conductor has a first source portion cryogenically sealed within the source cryogenically sealed chamber and a source end electrically connected to one or more source electrical output conductors, and one or more source refrigerant lines configured to feed gas refrigerant into the source cryogenically sealed chamber, where the gas refrigerant is configured to absorb heat from the source cryogenically sealed chamber. Also included in the source HTS cable terminator is a second source chamber connected to the first source chamber, the second source chamber having disposed therein a source heat exchanger thermally coupled to the one or more source refrigerant lines and configured to extract heat from the gas refrigerant. Also included in the HTS cable terminator system is an electrical power supply electrically connected to the one or more source electrical output conductors of the source HTS cable terminator, where the electrical power supply transmits power over the HTS cable via the source HTS cable terminator. Also included in the HTS cable terminator system is a load HTS cable terminator including a first load chamber having disposed therein a load terminator block electrically connected to the HTS cable conductor received within the first load chamber, a load cryogenically sealed chamber, a load cryogenically sealed chamber conductor electrically connected to the HTS cable conductor via the load terminator block, where the load cryogenically sealed chamber conductor has a first load portion cryogenically sealed within the load cryogenically sealed chamber and a load end electrically connected to one or more load electrical output conductors, and one or more load refrigerant lines configured to feed gas refrigerant into the load cryogenically sealed chamber, where the gas refrigerant is configured to absorb heat from the load cryogenically sealed chamber, and a second load chamber connected to the first load chamber, where the second load chamber has disposed therein a load heat exchanger thermally coupled to the one or more load refrigerant lines and configured to extract heat from the gas refrigerant. Also included in the HTS cable terminator system is an electrical load device electrically connected to the one or more electrical output conductors, where the power transmitted over the HTS cable is supplied to the electrical load via the load HTS cable terminator.

A method for terminating a high temperature superconducting (HTS) cable including electrically connecting an HTS cable to a terminator block within a first chamber of an HTS cable terminator, where the terminator block is electrically connected to a cryogenically sealed chamber conductor that is fed into a cryogenically sealed chamber within the first chamber, and where the cryogenically sealed chamber conductor has a first portion cryogenically sealed within the cryogenically sealed chamber and an end electrically connected to one or more electrical output conductors. Also included in the method is feeding, via one or more refrigerant lines, gas refrigerant into the cryogenically sealed chamber, where the one or more refrigerant lines is coupled to a heat exchanger located within a second chamber connected to the first chamber, and absorbing heat from the cryogenically sealed chamber into the gas refrigerant and extracting heat from the gas refrigerant in the heat exchanger.

DETAILED DESCRIPTION

In the following detailed description, numerous specific details are set forth by way of examples in order to provide a thorough understanding of the relevant design features. However, it should be apparent to those skilled in the art that the present design features may be practiced without such details. In other instances, well known methods, procedures, components, and circuitry have been described at a relatively high-level, without detail, in order to avoid unnecessarily obscuring aspects of the present design.

Examples of the subject matter disclosed herein are described primarily with respect to power cable distribution systems. It should be apparent, however, that the disclosed subject matter is not so limited. The systems, devices, and methods described herein may be usable in connection with any cryogenic or superconducting device. Other uses for the examples below will be known from the description herein.

HTS Cable

High temperature superconductor (HTS) cables are used in various applications to efficiently provide electrical power. HTS cables achieve superconductive properties by cooling the HTS/copper conductor to extremely low temperatures (e.g. 50 K) via the use of a cryogen, and by using a vacuum to thermally isolate the copper conductor and cryogen from the surrounding ambient environment. This allows the HTS cable to conduct many times the amount of power than it would otherwise normally would be able to conduct at ambient temperatures, while also avoiding introducing thermal energy into the cryogenic environment.

Figure 1:
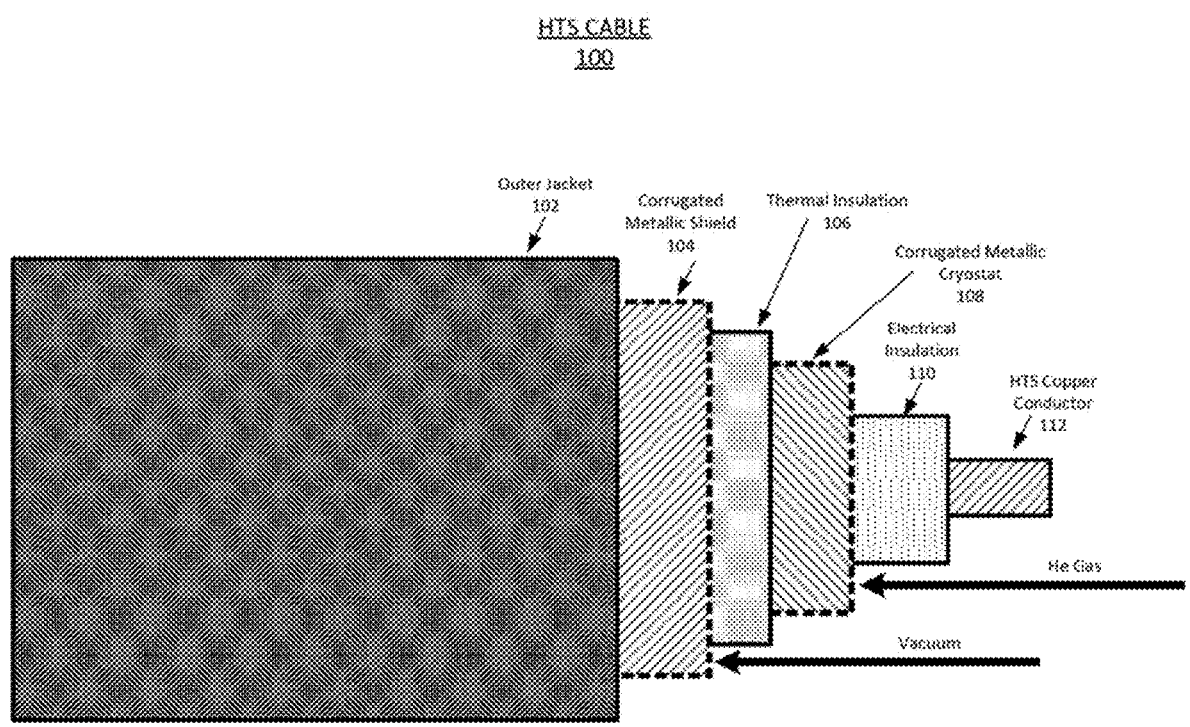
FIG. 1 is a diagram showing the layers of typical a high temperature superconductor cable, according to an aspect of the disclosure.

FIG. 1 is a diagram showing an example of an HTS cable 100 having its various layers peeled back for illustrative/descriptive purposes. In this example, HTS cable 100 includes six layers, including outer jacket 102, corrugated metallic shield 104, thermal insulation 106, corrugated metallic cryostat 108, electrical insulation 110 and HTS copper conductor 112. In order to cool HTS copper conductor 112 to a superconductive state, corrugated metallic cryostat 108 provides a vessel through which a cryogen, such as helium gas (GHe), is pumped, while electrical insulation 110 insulates HTS copper conductor 112 from corrugated metallic cryostat 108. Electrical insulation 110 preferably not only has good electrical insulation properties, but also has good thermal conductivity properties which allows the GHe to thermally conduct through to HTS copper conductor 112. In addition, and in order to isolate the copper conductor and GHe from the surrounding ambient environment, thermal insulation 106 lines corrugated metallic cryostat 108, while corrugated metallic shield 104 provides yet another vessel through which a vacuum is held (i.e. the space between corrugated metallic cryostat 108 and corrugated metallic shield 104 is held under vacuum). Outer jacket 102 is generally made of rubber or other durable material to provide physical protection for corrugated metallic shield 104.

It is noted that FIG. 1 is just one example of one type of HTS cable. Therefore, other HTS cable configurations with different layers of conductors, electrical insulators, thermal insulators, shields, and cryostats are also possible. However, for ease of description, termination of the HTS cable in FIG. 1 is described throughout the specification and shown in the figures. It should be noted that the various shading and cross-hatching used in the figures is provided for visual differentiation of adjacent components and is not intended to convey any limitations as to materials of construction.

HTS Cable Termination Overall

Figure 2:
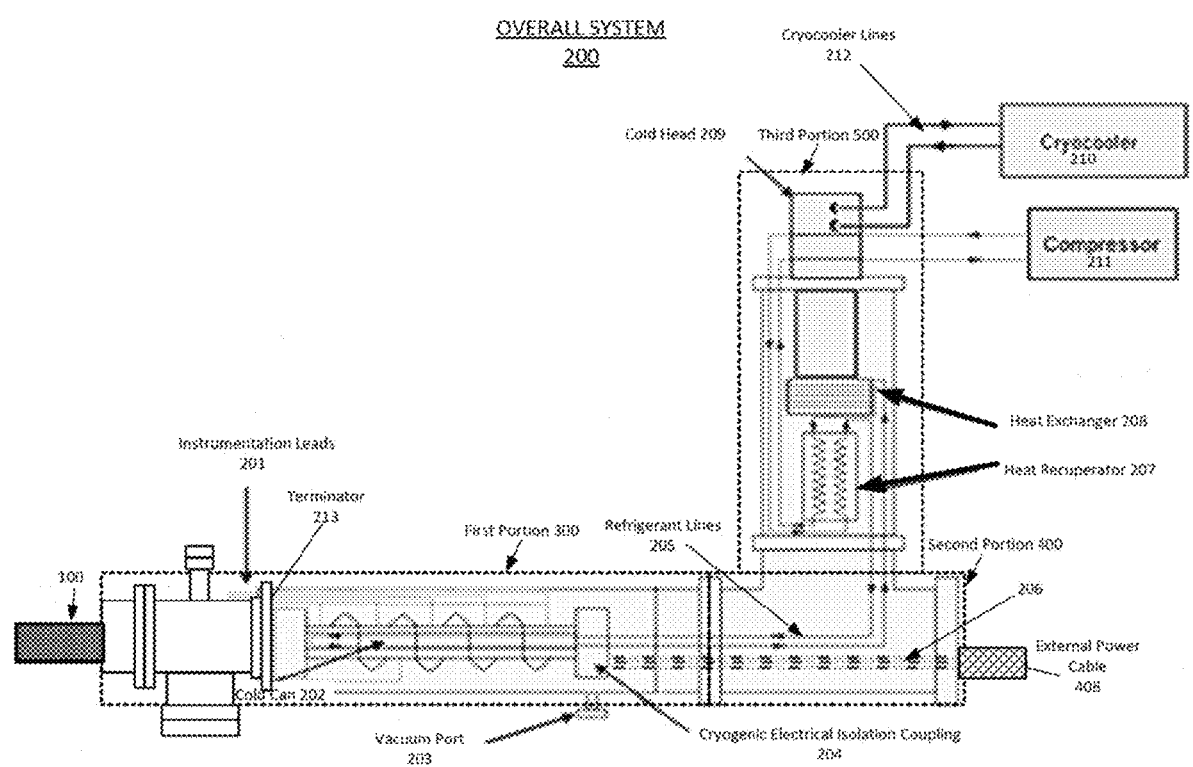
FIG. 2 is an overall system diagram of a high temperature superconductor cable termination for the cable in FIG. 1, according to an aspect of the disclosure.

FIG. 2 is an overall system diagram 200 of an HTS cable termination for terminating the HTS cable in FIG. 1. As an overview, the HTS cable termination is a warm-to-cold high temperature superconducting power cable termination suitable to potentially distribute 10's to 100's of MW of power with increased distribution voltages (e.g. greater than 450 VAC and/or 6-18 KVDC). In general, the HTS cable termination cools the transition region from ambient room temperature to 50 K using forced flow GHe coolant at 50 K. The forced flow GHe coolant is produced by a heat exchanger mounted on the cold head, and flow is produced by a GHe compressor. The temperature of the GHe ranges from ambient at the compressor 211, to tens of degrees K above the operating temperature exiting recuperator 207, and up to an operating temperature of 50 K exiting the heat exchanger 208. The pressure of GHe is about 15 psig at compressor 211 and decreases as the temperature decreases within the constant volume system. Electrical isolation is provided through a cryogenic coupling which allows significant simplification of the electrical isolation.

The HTS cable termination generally includes three main portions that are all interconnected together. A first portion 300 provides a vacuum/cryogen flow terminator 213 for electrically connecting to the HTS cable 100, a "cold can" 202 (e.g. cryogenically sealed and cooled chamber) for cooling the conductor, a cryogenic and electrical isolation coupling 204 for coupling refrigerant lines 205 and electrical input/output lines 206 to cold can 202, and a vacuum port 203 for connection to a source of vacuum for holding the overall system under vacuum. A second portion 400 that is connected to first portion 300 provides a vessel through which refrigerant lines 205 travel to third portion 500, and through which electrical output lines 206 travel and exit to the ambient environment for connection to external electrical loads and/or power sources. Third portion 500 houses a cooling mechanism for the overall system. Specifically, third portion 500 includes a heat recuperator 207, heat exchanger 208 and cold head 209. Cryocooler 210 pumps GHe into cold head 209, which cools heat exchanger 208, while compressor 211 compresses the refrigerant (e.g. GHe) for cycling throughout the system. During operation, prior to entering compressor 211, GHe returning from cold can 202 enters heat recuperator 207 via the return line and recuperates some of the heat from the adjacent high pressure refrigerant line coming from compressor 211. The high pressure refrigerant line then exits the recuperator and is wrapped around heat exchanger 208, which draws heat from the high pressure refrigerant line into cold head 209, thereby producing a cold GHe refrigerant that exits third portion 500 and is fed once again into cold can 202 to cool the HTS conductor.

Although not shown in FIG. 2, portions 300, 400 and 500 of the overall system are lined (either internally or externally) with thermal insulation such as multilayer insulation (MLI). This insulation helps insure that thermal energy does not transfer between the ambient environment and the cryosystem.

It is noted that electrical power can flow in either direction through system 200. In one example, electrical loads (not shown) are connected to external power cable 408. In this example, electrical power supplied by HTS cable 100 is provided to the electrical loads via the HTS terminator and external power cable 408. In another example, an electrical power source (not shown) is connected to external power cable 408. In this example, electrical power supplied by the power source is provided to HTS cable 100 via external power cable 408 and the HTS terminator. Further details of portions 300, 400 and 500 will now be described with reference to FIGS. 3-5 below.

HTS Cable Termination Portions

Figure 3:
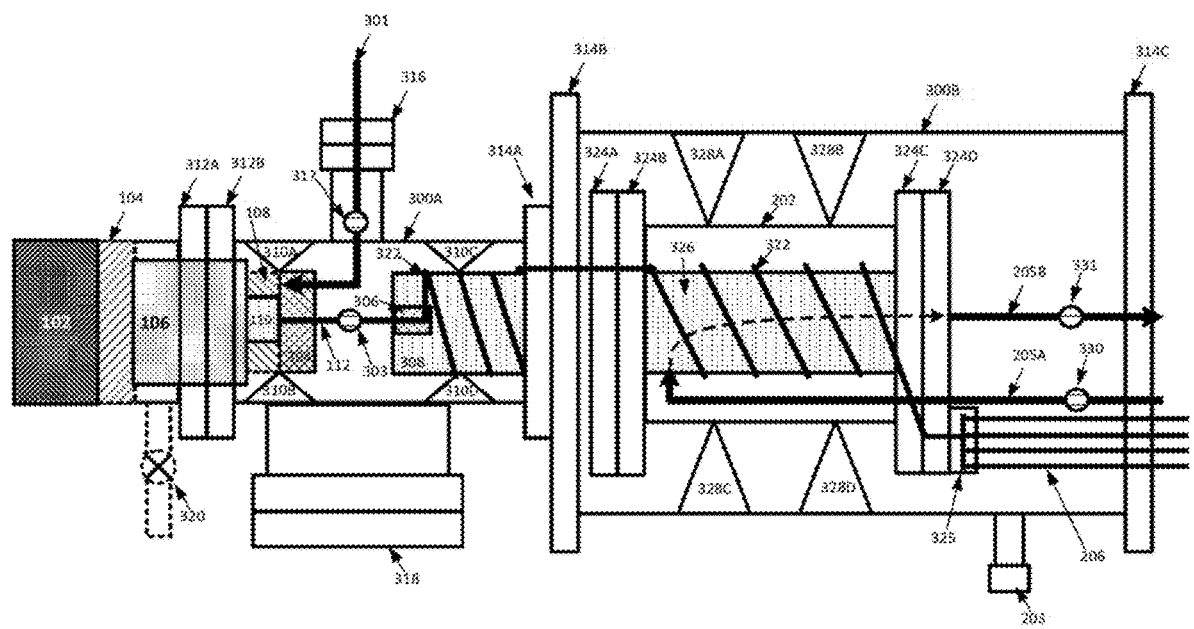
FIG. 3 is a diagram of a first portion of the high temperature superconductor cable termination shown in FIG. 2, according to an aspect of the disclosure.

FIG. 3 is a diagram of a first portion 300 of the HTS cable termination shown in FIG. 2. First portion 300 generally includes two distinct sections 300A and 300B. Each of these sections will now be described in detail.

Section 300A (cable terminator) is for electrically terminating the HTS cable to the system. HTS cable 100 enters FIG. 3 from the left side and has its layers peeled back to perform the termination process. For example, corrugated metallic shield 104 is exposed and fixed (e.g. welded) onto end flange 312A body of section 300A. Likewise, corrugated metallic cryostat 108 is fixed (e.g. welded) onto cable end flange 304, which is supported by supports 310A and 310B. HTS copper conductor 112 then passes through, and is insulated from cable end flange 304 via an insulating tube or a non-conductive epoxy resin. Cable end flange 304 also provides an inlet (not shown) for introducing GHe 301 via port 316 into the HTS cable 100. The flow of GHe 301 may be monitored by an optional flow sensor 317.

HTS copper conductor 112 exiting cable end flange 304 is bare, and may be monitored by sensor 303 (clamp-on sensor) for electrical current and temperature. Among others, sensor 303 may monitor electrical current flowing through HTS copper conductor 112 and temperature of HTS copper conductor 112. HTS copper conductor 112 is ultimately terminated at copper block 306 of nonconductive support tube 308, which is supported by supports 310C and 310D. The nonconductive support tube 308 is fixed, and the copper block 306 and/or the HTS/copper conductor 322 can slide along non-conductive support tube 308. Nonconductive support tube 308, as well as supports 310A-310D preferably comprise material such as a high pressure fiberglass laminate (e.g. G10) that has rigid physical properties, as well as good electrical insulation properties and good thermal conductivity properties. Another copper conductor 322 is also connected to copper block 306 and then coiled around nonconductive support tube 308 before entering section 300B via an insulating tube or a non-conductive epoxy resin in flanges 314A and 314B. Copper conductor 322 rests on nonconductive support tube 308, but is not fixed to nonconductive support tube 308. This configuration allows for conductor 322 to move (e.g. slide along) nonconductive support tube 308 as conductor 322 expands/contracts. Section 300A includes a vacuum port 320 for ensuring that section 300A is under vacuum, and an access port 318 (e.g. maintenance access port) for making and accessing the physical connections of the HTS cable described above. Once the HTS cable is properly terminated in section 300A, HTS/copper conductor 322 is exposed and needs to be cryocooled to maintain superconductive properties. This cryocooling is performed in adjacent section 300B.

Specifically, section 300B is for cryocooling electrical conductor 322 and electrically terminating the cryocooled electrical conductor 322 to electrical output lines 206. As mentioned above, HTS/copper conductor 322 is coiled around nonconductive support tube 308 before entering section 300B via flanges 314A and 314B. Once copper conductor 322 enters section 300B, it is then introduced into a cryogenically sealed vessel between flanges 324A/324B and flanges 324C/324D and supported by supports 328A-328D. This cryogenically sealed vessel is referred to as cold can 202. Cold can 202 generally includes a nonconductive support tube 326 (similar to the nonconductive support tube 308) that is made of high pressure fiberglass laminate (e.g. G10). Electrical conductor 322 is coiled around nonconductive support tube 326 within cold can 202. Conductor 322 then exits cold can 202 and terminates at cryogenic vacuum electrical feedthrough 325, which feeds electrical output conductors 206. Similar to nonconductive support tube 308, nonconductive support tube 326 allows for expansion and contraction of copper conductor 322 (i.e. conductor 322 can slide along nonconductive support tube 326 as it expands/contracts). During operation, GHe is pumped into one end of cold can 202 via refrigerant source line 205A, circulates throughout cold can 202 in order to cryocool copper conductor 322, and then exits cold can 202 at the opposite end via refrigerant return line 205B. The GHe generally circulates external to the diameter (on the external surface) of support tube 326 in order to flow over cryocool copper conductor 322. However, the support tube 326 may also have holes (not shown) that allow the GHe to circulate inside the diameter of support tube 326 to provide some conductive cooling of cryocool copper conductor 322 via thermally conducive support tube 326. The holes may be placed at any portion along the length of support tube 326, or may be located in proximity to refrigerant return line 205B. The refrigerant return line 205B may be positioned outside or inside the diameter of support tube 326. The temperature of the GHe entering/exiting the cold can 202 via lines 205A and 205B may be monitored by sensors 330 and 331. Controller 512 ensures that the cold head achieves operating temperatures. The GHe temperature entering and leaving the cold can is monitored to ensure proper operation. The GHe temperature is adjusted by varying the GHe mass flow. Refrigerant lines 205A/205B as well as electrical output lines 206 shown in FIG. 3 then exit first portion 300 and enter second portion 400 via flanges 314C and 404A.

Figure 4:
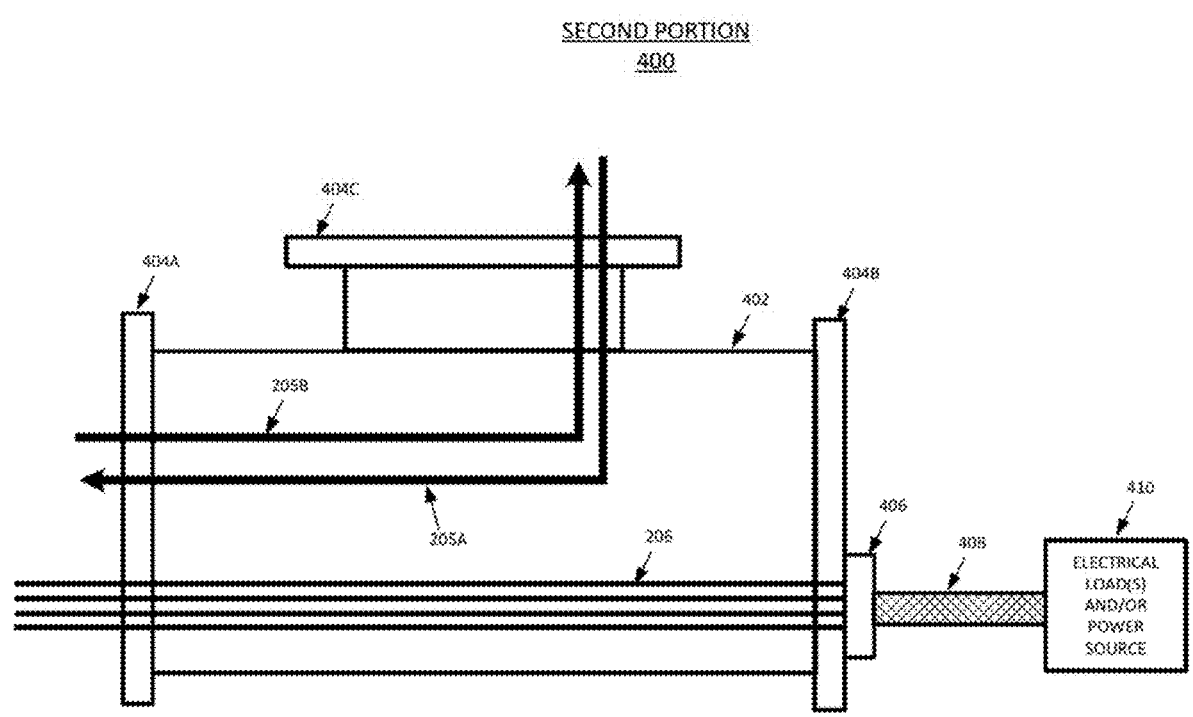
FIG. 4 is a diagram of a second portion of the high temperature superconductor cable termination shown in FIG. 2, according to an aspect of the disclosure.

FIG. 4 is a diagram of yet a second portion 400 of the HTS cable termination shown in FIG. 2. As shown in FIG. 4, refrigerant lines 205A/205B simply pass through section portion 400 on their way to third portion 500 via flange 404C. However, electrical output lines 206 pass through and exit section portion 400 via flange 404B where they are terminated at an electrical termination (e.g. plug) 406 to allow for electrical connection with external power cable 408 for feeding electrical loads 410 in the ambient environment. Electrical termination (e.g. plug) 406 also rely on a vacuum seal (e.g. non-conductive epoxy resin) to transition electrical output lines 206 from the vacuum to the ambient environment.

Although FIG. 4 shows refrigerant lines 205A/205B being physically separate from electrical output lines 206, other configurations are possible. For example, refrigerant lines 205A/205B may be placed directly next to (i.e. touching) electrical output lines 206 or may be coiled around and touching electrical output lines 206 to provide continued cooling of electrical output lines 206 as they travel through portion 400.

Figure 5:
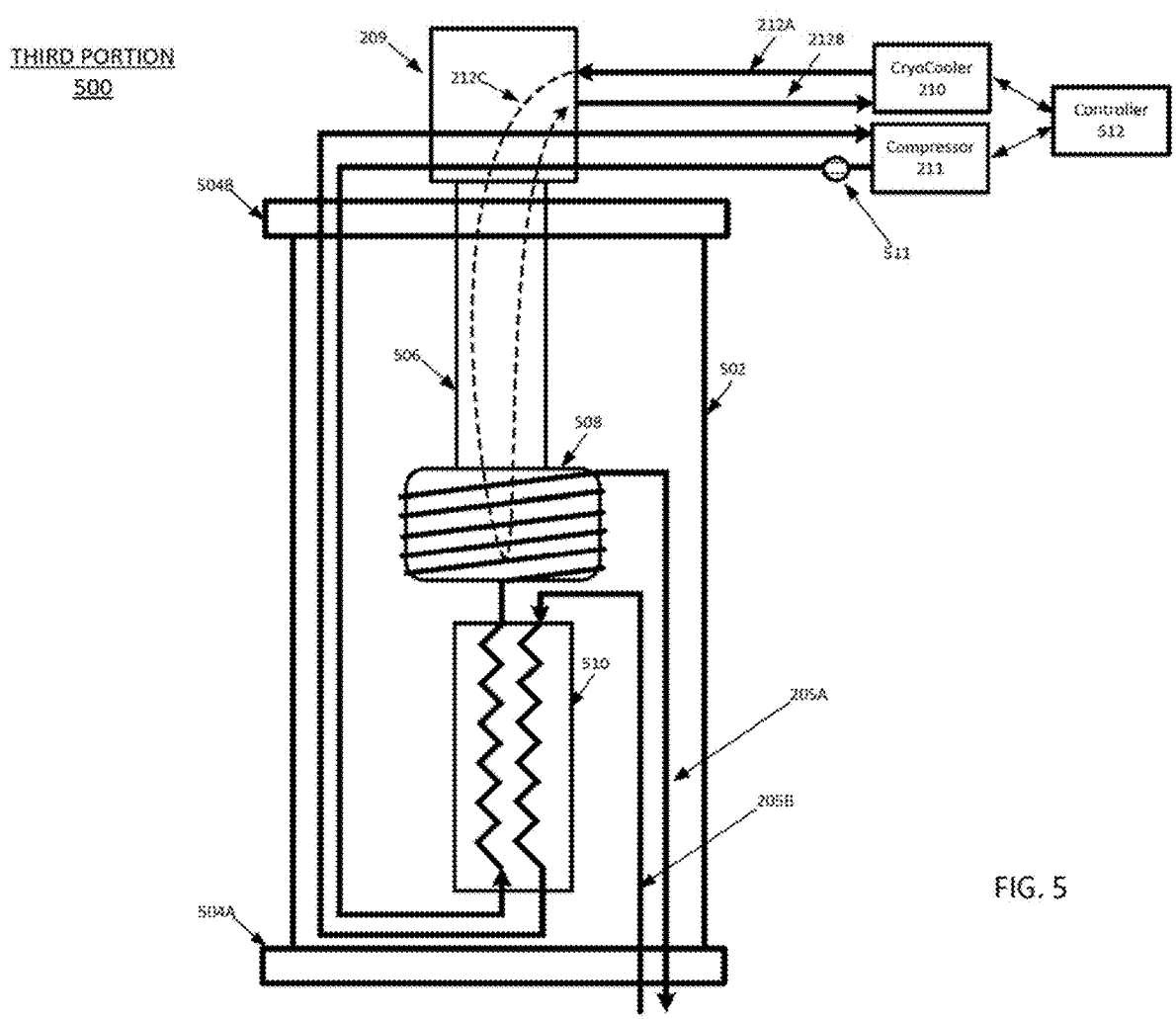
FIG. 5 is a diagram of a third portion of the high temperature superconductor cable termination shown in FIG. 2, according to an aspect of the disclosure.

FIG. 5 is a diagram of a third portion 500 of the HTS cable termination shown in FIG. 2. Third portion 500 acts as a cooling system for the refrigerant. As shown in FIG. 4, refrigerant lines 205A/205B pass through section portion 400 and enter third portion 500 via flanges 404C and 504A. As shown in FIG. 5, refrigerant return line 205B returning from cold can 202 enters heat recuperator 510 and then enters compressor 211. After exiting compressor 211, refrigerant return line 205B then reenters heat recuperator 510, and finally enters heat exchanger 508 before exiting as refrigerant supply line 205A and returning to cold can 202. While inside heat recuperator 510, refrigerant line 205B returning from cold can 202 recuperates some of the heat from the adjacent refrigerant line exiting compressor 211 (e.g. the refrigerant exiting the compressor is pre-cooled before entering heat exchanger 508). Cryocooler 210 pumps GHe into cold head section 209 via line 212A. As shown by line 212C, the GHe flows through cold head section 209 and into cold head section 506 to cool off heat exchanger 508. Specifically, heat from the refrigerant line coiled around heat exchanger 508 is absorbed into the expanding GHe pumped through cold head section 506 by cryocooler 210. The GHe returns to cryocooler 210 via line 212B and the cycle continues. The use of heat recuperator 510 provide a means for aiding the heat exchanger 508 in performing heat transfer to achieve a refrigerant temperature of 50K, while the use of compressor 211 provides a means for achieving an appropriate flow rate of the refrigerant through the system without introducing moving parts (e.g. fans, etc.) in the cryogenic environment.

It is noted that the refrigerant lines 205A/205B may be small in size while also providing adequate cooling of the terminator. For example, refrigerant lines 205A/205B may have a diameter in the range of small capillary tube sizes (e.g. 0.5 mm) to standard refrigerant line sizes (e.g. 25 mm). In order to ensure adequate cooling of the terminator, the compressor is controlled based on the size of the refrigerant lines to achieve a pressure that ensures a flow rate of the GHe that achieves adequate cooling (e.g. as the size of the refrigerant lines decreases, the pressure of the compressor increases to increase GHe flow through the system).

It is also noted that while depicted in FIGS. 2 and 3 with the GHe returning to cryocooler directly from the cold head, in some embodiments, the GHe may continue to cool a portion of the cable beyond the termination (e.g. via a connection to cryostat 108), with a return line (not shown, but for example, a line disposed within the annulus between cryostat 108 and insulation 110) from a relevant portion of the cryostat to the cryocooler. Furthermore, it should be understood that although discussed herein with respect to a specific cable termination structure, similar cooling systems may be provided for feeding the cryostat, with cryocooler, compressor, heat exchanger, and heat recuperator connected via lines feeding the GHe to the cryostat, and returning the GHe from a return line, through a port such as port 316, while the cooling system remains electrically isolated and insulated from the HTS cable. Thus, a complete cable cooling system may include first and second termination units, as described herein, and one or more additional cooling systems in series disposed between the first and second termination units.

It is noted that a non-conductive epoxy resin or other means may be used at each location where copper conductors 112, 322 and 206 or refrigerant lines 205A/205B enter/exit various portions of the overall design. This ensures that copper conductors 112, 322 and 206 are electrically insulated from contact with grounded portions of the design, as well as providing a means for maintaining vacuum and cryogenic isolation.

Figure 6:
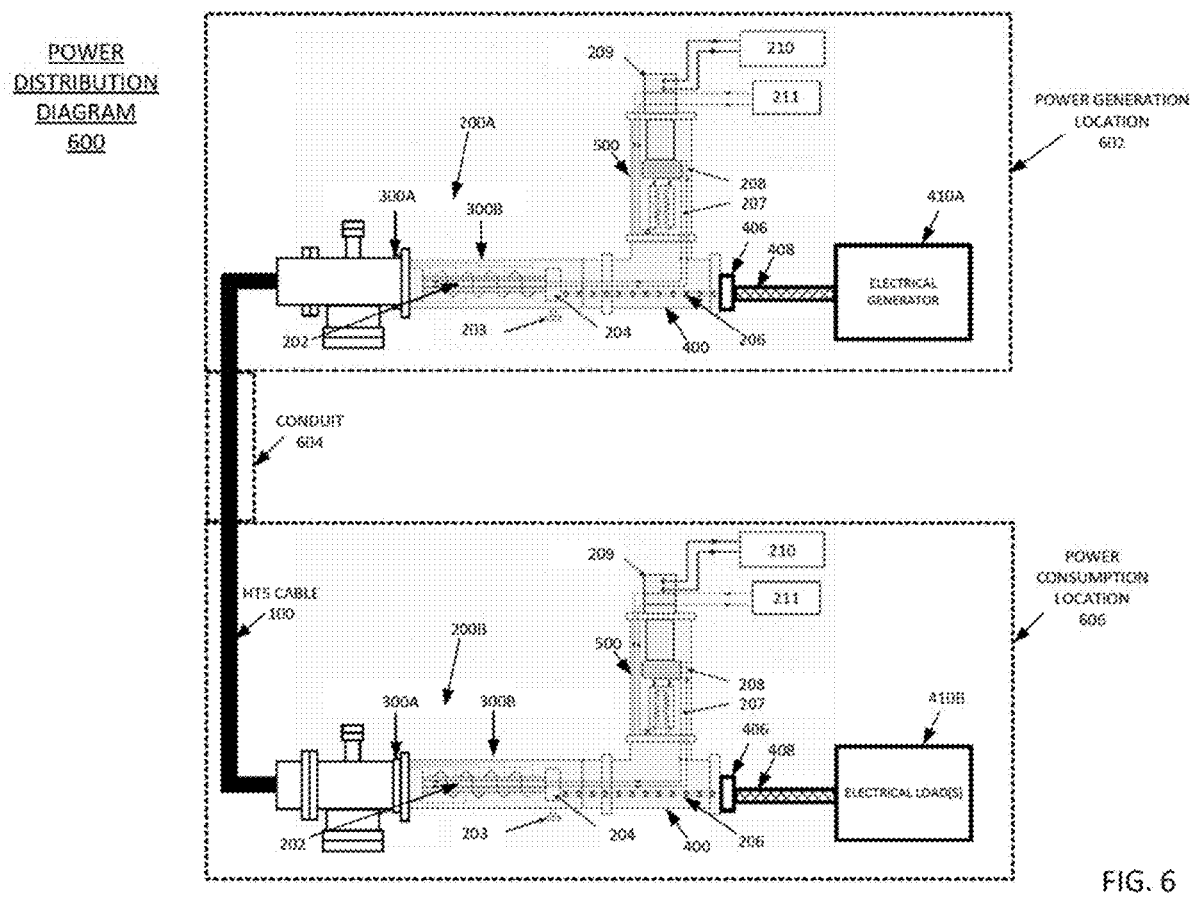
FIG. 6 is an example of a power distribution diagram using the high temperature superconductor cable termination shown in FIG. 2, according to an aspect of the disclosure.

Now that the functionality and structure of the high temperature superconductor cable termination shown in FIG. 2 has been described, a specific application will now be described. FIG. 6 is an example of a power distribution diagram 600 using the high temperature superconductor cable termination 200 shown in FIG. 2. As shown in FIG. 6, high temperature superconductor cable termination system 200A is located in power generation location (e.g. room) 602. An electrical generator 410A is driven to generate power. This power is then input to high temperature superconductor cable termination system 200 via external power cable 408. The electrical power flows through electrical output lines 206 and into cold can 202 of section 300B for cryocooling. The cryocooled conductor then terminates in section 300A to HTS cable 100. The electrical power is then transmitted over HTS cable 100 to power consumption location (e.g. room) 606 via HTS conduit 604. A duplicate high temperature superconductor cable termination system 200B is located in power consumption room 606 to receive the electrical power by performing the reverse process as described above. Specifically, high temperature superconductor cable termination system 200 in power consumption room 606 terminates the HTS cable 100 in section 300A, cryocools the conductor in section 300B and outputs the electrical power to electrical loads 410B in the ambient environment via external power cable 408.

The HTS cable termination described above has many benefits over conventional HTS cable terminations. For example, the coolant is GHe at 50 K, which does not have large expansion volumes compared to liquid cryogens, and can be more easily distributed over large distances to restricted areas and volumes so that the terminator matches HTS cable dimensions. The GHe coolant also integrates well with cooling systems for HTS cables, which are already suited for GHe. The cooling system uses an off-the-shelf compressor that in at least some embodiments operates in the ambient environment (e.g. room temperature=~293K+/−10K) and moves the GHe refrigerant through the system, as well as a standard mass flow meter 511 that measures GHe flow. This is beneficial, because no moving parts (e.g. fans, etc.) are required within the cryogenic environment to move the GHe refrigerant through the system. Thus, embodiments of the cooling methods and systems as described herein may operate, or be configured to operate, without any moving parts being subjected to cryogenic temperatures (e.g. 50K or below). In addition, the use of cryogenic couplings allows for the separation of electrical isolation or insulation systems from thermal systems resulting in flexibility and simplification of the overall system.

Cryocooler 210, compressor 211 and vacuum pump (not shown) for holding the system under vacuum, the sensors 303, 330 and 331 for monitoring the electrical, vacuum, and cryogenic performance of the system, respectively, may be controlled by a controller 512 that may include a processor, memory, and user I/O (not shown). The functions performed by the controller described herein, such as controlling the compressor, and monitoring the various sensors may be implemented in software code or instructions which are tangibly stored on a tangible computer readable medium. Upon loading and executing such software code or instructions, the processor of controller may perform any of the functionality of the controller described herein. The mass flow of GHe directly affects the temperature of the GHe, and therefore the flow may be manually adjusted by a user, or automatically adjusted by a controller to control the temperature of the GHe. The controller also monitors electrical parameters such as voltage and current, and may dump the transport current to an external dump resistor (not shown) to dissipate some of the stored energy if a quench occurs, rather than internally heating the HTS/copper conductor.

Although the cable terminator device described throughout the specification as being used for HTS/copper, it is noted that other conductors could be used. For example, this cable terminator device could also be used for non-HTS conductors such as cryogenically cooled copper or aluminum conductors.

Ideal applications for the technology as presented herein may include shipboard applications, such as in a naval vessel, but the invention is not limited to any particular manner or location of use.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A high temperature superconducting (HTS) cable terminator comprising:
    a first chamber having disposed therein:
        a terminator block electrically connected to an HTS cable conductor received within the first chamber,
        a cryogenically sealed chamber,
        a cryogenically sealed chamber conductor electrically connected to the HTS cable conductor via the terminator block, the cryogenically sealed chamber conductor having a first portion cryogenically sealed within the cryogenically sealed chamber and an end electrically connected to one or more electrical output conductors, and
        one or more refrigerant lines configured to feed gas refrigerant into the cryogenically sealed chamber, the gas refrigerant configured to absorb heat from the cryogenically sealed chamber; and
    a second chamber connected to the first chamber, the second chamber having disposed therein a heat exchanger thermally coupled to the one or more refrigerant lines and configured to extract heat from the gas refrigerant.

2. The HTS cable terminator of claim 1, further comprising:
    a nonconductive support tube extending a length of the cryogenically sealed chamber,
    wherein the first portion of the cryogenically sealed chamber conductor is coiled around the nonconductive support tube and configured to be cooled by the gas refrigerant.

3. The HTS cable terminator of claim 1, further comprising:
    a nonconductive support surface coupled to the terminator block, the cryogenically sealed chamber conductor having a second portion located outside of the sealed chamber, coiled around the nonconductive support surface, connected to the terminator block, and configured to slide along the nonconductive support surface during expansion and contraction of the cryogenically sealed chamber conductor.

4. The HTS cable terminator of claim 1, further comprising:
    a vacuum pump connected to and configured to create a vacuum within both the first chamber and the second chamber.

5. The HTS cable terminator of claim 1, further comprising:
    an external electrical terminator located in an ambient environment and electrically connected to the one or more electrical output conductors.

6. The HTS cable terminator of claim 1, wherein the first chamber and the second chamber each have a
    thermal insulation lining a respective internal surfaces thereof.

7. The HTS cable terminator of claim 1, further comprising:
    a cold head within the second chamber and configured to receive coolant from a cryogenic cooler connected to the cold head, the cold head thermally coupled to the one or more refrigerant lines in the heat exchanger.

8. The HTS cable terminator of claim 1, further comprising:
    a compressor configured to compress the refrigerant and output the compressed refrigerant into the one or more refrigerant lines; and
    a heat recuperator in the second chamber and thermally coupled to the one or more refrigerant lines receiving output from the compressor, the heat recuperator configured to recuperate heat from the compressed refrigerant.

9. The HTS cable terminator of claim 1,
    wherein the nonconductive support tube comprises G10 fiberglass.

10. The HTS cable terminator of claim 1,
    wherein the gas refrigerant comprises Helium gas.

11. The HTS cable terminator of claim 1,
    wherein the one or more refrigerant lines define a closed loop system that does not provide refrigerant to a cryostat of the HTS cable.

12. The HTS cable terminator of claim 1,
    wherein the one or more refrigerant lines define a closed loop system that also provides refrigerant to a cryostat of the HTS cable.

13. A high temperature superconducting (HTS) cable terminator system comprising:
    a source HTS cable terminator including:
        a first source chamber having disposed therein:
            a source terminator block electrically connected to an HTS cable conductor received within the first source chamber,
            a source cryogenically sealed chamber,
            a source cryogenically sealed chamber conductor electrically connected to the HTS cable conductor via the source terminator block, the source cryogenically sealed chamber conductor having a first source portion cryogenically sealed within the source cryogenically sealed chamber and a source end electrically connected to one or more source electrical output conductors, and
            one or more source refrigerant lines configured to feed gas refrigerant into the source cryogenically sealed chamber, the gas refrigerant configured to absorb heat from the source cryogenically sealed chamber, and a second source chamber connected to the first source chamber, the second source chamber having disposed therein a source heat exchanger thermally coupled to the one or more source refrigerant lines and configured to extract heat from the gas refrigerant;

an electrical power supply electrically connected to the one or more source electrical output conductors of the source HTS cable terminator, the electrical power supply transmitting power over the HTS cable via the source HTS cable terminator;

a load HTS cable terminator including:

a first load chamber having disposed therein:

a load terminator block electrically connected to the HTS cable conductor received within the first load chamber, a load cryogenically sealed chamber, a load cryogenically sealed chamber conductor electrically connected to the HTS cable conductor via the load terminator block, the load cryogenically sealed chamber conductor having a first load portion cryogenically sealed within the load cryogenically sealed chamber and a load end electrically connected to one or more load electrical output conductors, and one or more load refrigerant lines configured to feed gas refrigerant into the load cryogenically sealed chamber, the gas refrigerant configured to absorb heat from the load cryogenically sealed chamber, and a second load chamber connected to the first load chamber, the second load chamber having disposed therein a load heat exchanger thermally coupled to the one or more load refrigerant lines and configured to extract heat from the gas refrigerant; and an electrical load device electrically connected to the one or more electrical output conductors, the power transmitted over the HTS cable being supplied to the electrical load via the load HTS cable terminator.

14. A method for terminating a high temperature superconducting (HTS) cable, the method comprising:

electrically connecting an HTS cable to a terminator block within a first chamber of an HTS cable terminator, the terminator block being electrically connected to a cryogenically sealed chamber conductor that is fed into a cryogenically sealed chamber within the first chamber, the cryogenically sealed chamber conductor having a first portion cryogenically sealed within the cryogenically sealed chamber and an end electrically connected to one or more electrical output conductors; and feeding, via one or more refrigerant lines, gas refrigerant into the cryogenically sealed chamber, the one or more refrigerant lines coupled to a heat exchanger located within a second chamber connected to the first chamber, and absorbing heat from the cryogenically sealed chamber into the gas refrigerant and extracting heat from the gas refrigerant in the heat exchanger.

15. The method of claim 14, further comprising providing a vacuum within the first chamber and the second chamber.

16. A high temperature superconducting (HTS) cable cooling system, comprising:

a first chamber having disposed therein:

a cryogenically sealed chamber, one or more refrigerant lines configured to feed gas refrigerant into the cryogenically sealed chamber, the gas refrigerant configured to absorb heat from the cryogenically sealed chamber; and a second chamber connected to the first chamber, the second chamber having disposed therein a heat exchanger thermally coupled to the one or more refrigerant lines and configured to extract heat from the gas refrigerant;

a vacuum pump connected to and configured to create a vacuum within both the first chamber and the second chamber;

a cold head within the second chamber and configured to receive coolant from a cryogenic cooler connected to the cold head, the cold head thermally coupled to the one or more refrigerant lines in the heat exchanger;

a compressor configured to compress the refrigerant and output the compressed refrigerant into the one or more refrigerant lines; and a heat recuperator in the second chamber and thermally coupled to the one or more refrigerant lines receiving output from the compressor, the heat recuperator configured to recuperate heat from the compressed refrigerant, wherein the gas refrigerant comprises Helium gas.

17. The HTS cooling system of claim 16, further comprising:

a terminator block electrically connected to an HTS cable conductor received within the first chamber, a cryogenically sealed chamber conductor electrically connected to the HTS cable conductor via the terminator block, the cryogenically sealed chamber conductor having a first portion cryogenically sealed within the cryogenically sealed chamber and an end electrically connected to one or more electrical output conductors, and a nonconductive support surface coupled to the terminator block, the cryogenically sealed chamber conductor having a second portion located outside of the sealed chamber, coiled around the nonconductive support surface, connected to the terminator block, and configured to slide along the nonconductive support surface during expansion and contraction of the cryogenically sealed chamber conductor.

18. The HTS cooling system of claim 16, wherein the one or more refrigerant lines define a closed loop system that provides refrigerant to a cryostat of the HTS cable.

* * * * *